United States Patent
Koroly et al.

(10) Patent No.: US 12,491,701 B2
(45) Date of Patent: *Dec. 9, 2025

(54) COMMINGLED FIBER PREFORM ARCHITECTURE FOR HIGH TEMPERATURE COMPOSITES

(71) Applicant: ROHR, INC., Chula Vista, CA (US)

(72) Inventors: Christopher C. Koroly, Spring Valley, CA (US); Katherine E. Waugh, San Diego, CA (US); Bryan Thai, Poway, CA (US); Vijay V. Pujar, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,716

(22) Filed: May 22, 2023

(65) Prior Publication Data

US 2024/0391212 A1    Nov. 28, 2024

(51) Int. Cl.
*B32B 7/09*        (2019.01)
*B32B 5/26*        (2006.01)
(Continued)

(52) U.S. Cl.
CPC .............. *B32B 7/09* (2019.01); *B32B 5/263* (2021.05); *B32B 7/03* (2019.01); *B32B 37/06* (2013.01);
(Continued)

(58) Field of Classification Search
CPC .. B32B 7/09; B32B 5/263; B32B 7/03; B32B 37/06; B32B 38/1841; B32B 2250/02;
(Continued)

(56) References Cited

U.S. PATENT DOCUMENTS 4,885,973 A * 12/1989 Spain ...................... D04C 3/12
                                                          87/8
6,009,605 A   1/2000 Olry et al.
(Continued)

FOREIGN PATENT DOCUMENTS

| CN | 110093713  | 8/2019 |
| CN | 114645483  | 6/2022 |
| WO | 2011099611 | 8/2011 |

OTHER PUBLICATIONS

European Patent Office, European Search Report dated Sep. 2, 2024 in Application No. 24177092.4.

*Primary Examiner* — Elizabeth M Imani
(74) *Attorney, Agent, or Firm* — SNELL & WILMER L.L.P.

(57) ABSTRACT

A commingled fiber preform is provided. The commingled fiber preform includes a plurality of first fabric layers and a second fabric layer. The second fabric layer is positioned on top of the plurality of first fabric layers. The second fabric layer is joined to the plurality of first fabric layers via through thickness reinforcement (TTR) using a commingled thread. A transport depth of the TTR penetrates completely through a thickness of the second fabric layer and partially through a thickness of the plurality of first fabric layers. The commingled thread comprises carbon fibers commingled with fugitive fibers. The fugitive fibers are pyrolyzed from the commingled fiber preform to create a path through the thickness for infiltration of fluids.

18 Claims, 13 Drawing Sheets

(51) Int. Cl.
*B32B 7/03* (2019.01)
*B32B 37/06* (2006.01)
*B32B 38/18* (2006.01)

(52) U.S. Cl.
CPC ...... *B32B 38/1841* (2013.01); *B32B 2250/02* (2013.01); *B32B 2250/20* (2013.01); *B32B 2262/106* (2013.01); *B32B 2262/148* (2021.05); *B32B 2305/188* (2013.01); *B32B 2313/04* (2013.01)

(58) Field of Classification Search
CPC .......... B32B 2250/20; B32B 2262/106; B32B 2262/148; B32B 2305/188; B32B 2313/04
See application file for complete search history.

(56) References Cited

U.S. PATENT DOCUMENTS

| | | | |
|---|---|---|---|
| 8,752,255 B2 | 6/2014 | Lecostaouec | |
| 10,995,039 B1 | 5/2021 | Dunn et al. | |
| 11,434,176 B2 | 9/2022 | Harris | |
| 2003/0100239 A1* | 5/2003 | Gaffney | D01F 9/22 442/212 |
| 2006/0283014 A1* | 12/2006 | Subramanian | C04B 35/62868 29/889.7 |
| 2016/0060115 A1* | 3/2016 | La Forest | C04B 35/62886 423/445 R |
| 2016/0348511 A1* | 12/2016 | Varney | C04B 38/065 |
| 2018/0126674 A1 | 5/2018 | Ohtani et al. | |
| 2019/0177240 A1* | 6/2019 | Harris | D02J 13/00 |
| 2020/0308066 A1* | 10/2020 | Shiang | C04B 35/638 |

* cited by examiner

COMMINGLED FIBER PREFORM ARCHITECTURE FOR HIGH TEMPERATURE COMPOSITES

FIELD

The present disclosure relates generally to composite preform components and, more particularly, to a commingled fiber preform architecture for high temperature composites.

BACKGROUND

Shaped composite bodies are utilized in aerospace applications. Various systems and methods are known in the art for forming a preform into a shaped composite body. In typical carbon-carbon manufacturing, a dry fabric may be used to make a preform. The dry preform is then densified using gas infiltration. There are many variables that determine the success of the densification stage, including the number of available pathways for the gas to infiltrate uniformly into the center of the preform.

SUMMARY

According to various embodiments of the present disclosure, a commingled fiber preform is provided. The commingled fiber preform includes a plurality of first fabric layers and a second fabric layer. The second fabric layer is positioned on top of the plurality of first fabric layers. The second fabric layer is joined to the plurality of first fabric layers via through thickness reinforcement (TTR) using a commingled thread. A transport depth of the TTR penetrates completely through a thickness of the second fabric layer plurality of first fabric layers and partially through a thickness of the plurality of first fabric layers. The commingled thread comprises carbon fibers commingled with fugitive fibers. The fugitive fibers are pyrolyzed from the commingled fiber preform to create a path through the thickness for infiltration of fluids.

In various embodiments, the plurality of first fabric layers and the second fabric layer comprise carbon fibers commingled with fusible fibers. In various embodiments, the plurality of first fabric layers and the second fabric layer comprise carbon fibers commingled with fusible fibers and fugitive fibers. In various embodiments, a percentage of the carbon fibers and fugitive fibers in the commingled thread is each at least 10% by volume.

In various embodiments, the plurality of first fabric layers and the second fabric layer comprise carbon fibers commingled with at least one of fusible fibers or fugitive fibers. In various embodiments, a percentage of the carbon fibers in the plurality of first fabric layers and the second fabric layer exceeds a percentage of the fusible fibers or the fugitive fibers in the plurality of first fabric layers and the second fabric layer. In various embodiments, at least one of the fugitive fibers or the fugitive fibers are pyrolyzed from the commingled fiber preform. In various embodiments, the commingled thread further comprises first fusible fibers. In various embodiments, the TTR is uniform throughout a length of the plurality of first fabric layers and the second fabric layer. In various embodiments, the TTR is random throughout a length of the plurality of first fabric layers and the second fabric layer.

In various embodiments, the plurality of first fabric layers and the second fabric layer have directionality indicated by a tow in each of the plurality of first fabric layers and the second fabric layer. In various embodiments, in positioning the second fabric layer on top of the plurality of first fabric layers, the directionality is the same. In various embodiments, the plurality of first fabric layers and the second fabric layer have directionality indicated by a tow in each of the plurality of first fabric layers and the second fabric layer. In various embodiments, in positioning the second fabric layer on top of the plurality of first fabric layers, the directionality differs.

According to various embodiments of the present disclosure, a manufacturing method is provided. The method includes forming a commingled fiber preform by arranging a second fabric layer on top of a plurality of first fabric layers and joining the second fabric layer to the plurality of first fabric layers via through thickness reinforcement (TTR) using a commingled thread. In various embodiments, a transport depth of the TTR penetrates completely through a thickness of the second fabric layer and partially through a thickness of the plurality of first fabric layers. In various embodiments, the commingled thread comprises carbon fibers commingled with fugitive fibers. In various embodiments, the fugitive fibers are pyrolyzed from the commingled fiber preform to create a path through the thickness for infiltration of fluids.

In various embodiments, the plurality of first fabric layers and the second fabric layer comprise carbon fibers commingled with fusible fibers. In various embodiments, the plurality of first fabric layers and the second fabric layer comprise carbon fibers commingled with fusible fibers. In various embodiments, a percentage of the carbon fibers and fugitive fibers in the commingled thread is each at least 10% by volume.

In various embodiments, the plurality of first fabric layers and the second fabric layer comprise carbon fibers commingled with at least one of fusible fibers or fugitive fibers. In various embodiments, a percentage of the carbon fibers in the plurality of first fabric layers and the second fabric layer exceeds a percentage of the fusible fibers or the fugitive fibers in the plurality of first fabric layers and the second fabric layer. In various embodiments, at least one of the fusible fibers or the fugitive fibers are pyrolyzed from the commingled fiber preform. In various embodiments, the commingled thread further comprises first fusible fibers. In various embodiments, the TTR is uniform throughout a length of the plurality of first fabric layers and the second fabric layer. In various embodiments, the TTR is random throughout a length of the plurality of first fabric layers and the second fabric layer.

In various embodiments, the plurality of first fabric layers and the second fabric layer have directionality indicated by a tow in each of the plurality of first fabric layers and the second fabric layer. In various embodiments, in positioning the second fabric layer on top of the plurality of first fabric layers, the directionality is the same. In various embodiments, the plurality of first fabric layers and the second fabric layer have directionality indicated by a tow in each of the plurality of first fabric layers and the second fabric layer. In various embodiments, in positioning the second fabric layer on top of the plurality of first fabric layers, the directionality differs.

The present disclosure may include any one or more of the individual features disclosed above and/or below alone or in any combination thereof.

The foregoing features and elements may be combined in various combinations without exclusivity, unless expressly indicated herein otherwise. These features and elements as

DETAILED DESCRIPTION

Figure 1:
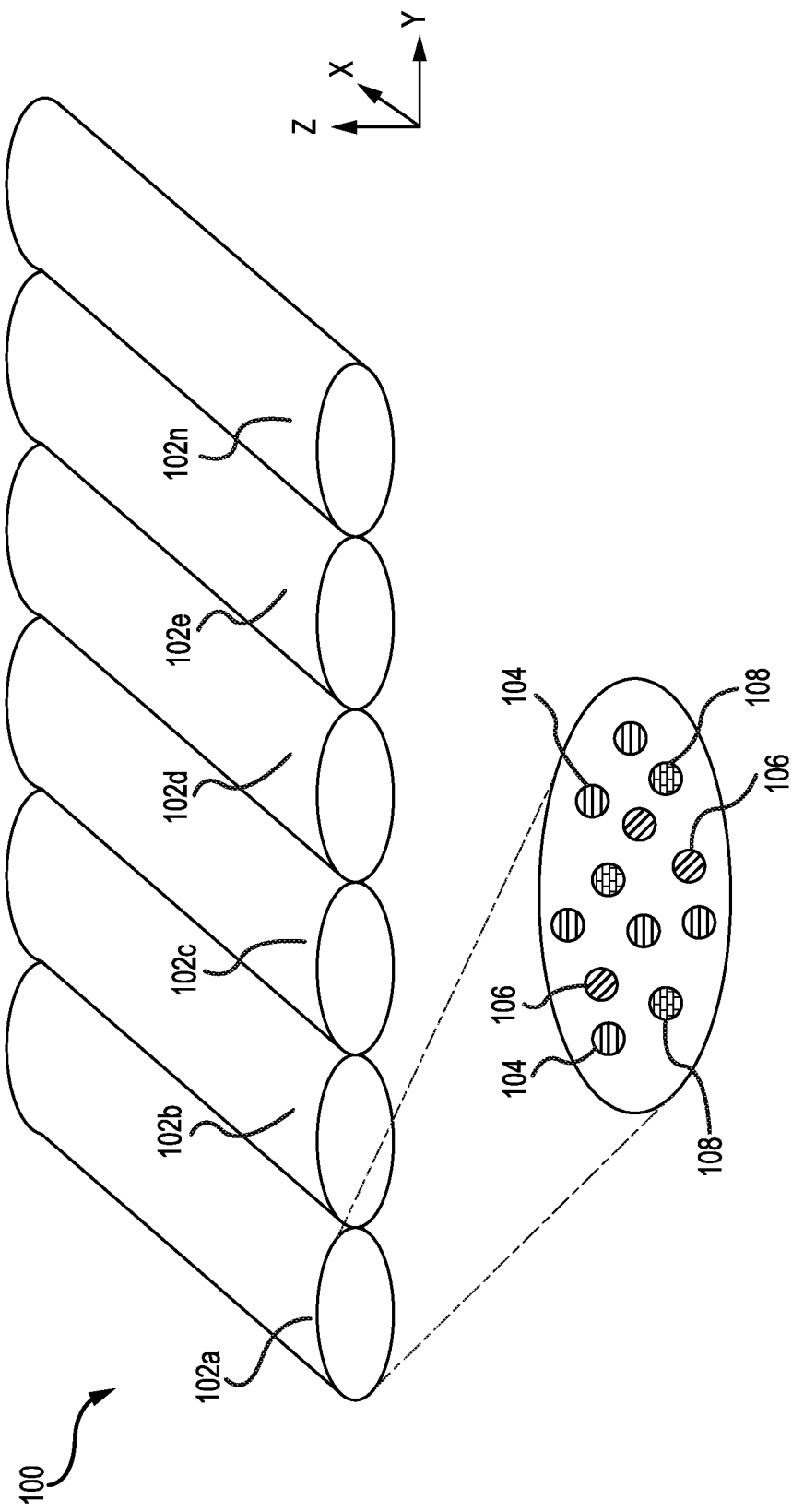
FIG. 1 illustrates a fabric layer formed using commingled fibers including percentages of fugitive fibers, fusible fibers, and/or carbon fibers, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Various systems and methods are known in the art for generating a commingled fiber preform. Commingled fibers and yarn typically entangle thermoplastic or thermoset fibers with carbon, glass, or other reinforcement fibers to produce a low-cost, yet highly-flexible material utilized to manufacture components with complex geometries. In typical carbon-carbon manufacturing, a commingled fiber preform may be manufactured and this commingled fiber preform may then be densified using gas infiltration. There are many variables that determine the success of the densification stage, including the number of available pathways for the gas to infiltrate uniformly into the center of the commingled fiber preform. Typically, fiber volume and lack of adequate gas flow paths inhibit uniform densification and yield a component with less than 10 percent open porosity.

Disclosed herein are systems and methods for a commingled fiber preform architecture for high temperature composites that provides numerous pathways for fluids, i.e. uniform gas, infiltration into the center of the commingled fiber preform during densification. In various embodiments, commingled fibers using desired percentages of fugitive fibers, fusible fibers, and/or carbon fibers are fabricated into a fabric layers of either woven fabric layers, a non-crimp fabric layers, such as unidirectional or stitched unidirectional, or a felt fabric layers.

As used herein, a fusible fiber is comprised of one or more polymers with a combined char yield of 25% elemental carbon or greater by weight and a residual mass of less than 1% by weight. As used herein, a fugitive fiber is comprised of one or more polymers with a combined char yield of 5% elemental carbon or less by weight, and a residual mass of less than 1% by weight. As used herein, char yield is defined as the weight of the carbon remaining expressed as a percentage of the total starting weight of the fiber when the fiber material is heated (or pyrolyzed) in an inert atmosphere (e.g., nitrogen or argon) at temperatures of up to about 1000 degrees Celsius (about 1832 degrees fahrenheit). As used herein, residual mass is defined as the weight of the fiber remaining expressed as a percentage of the total weight of the starting fiber when the fiber material is heated (or oxidized) in an oxidizing atmosphere (e.g., air, or oxygen) at temperatures of up to about 1000 degrees Celsius (about 1832 degrees fahrenheit). It should be noted that while a residual mass of 1% or less is preferred in the production of carbon-carbon composite structures for high temperature applications, a residual mass of greater than 1% may be acceptable for certain lower temperature applications or in applications where the excessive residual mass and the associated residues do not adversely impact performance.

In various embodiments, carbon fibers may include a variety of carbon moduli but, for flexibility during preform lay-up, standard or intermediate modulus carbon fibers may be preferred. In various embodiments, carbon fibers are comprised of 85% of carbon by weight or greater. In various embodiments, fugitive fibers may include fibers without harmful byproducts that, responsive to being burned, burn under carbon-carbon processing temperatures, e.g. under 800 degrees Celsius (1472 degrees fahrenheit). In that regard, fugitive fibers may be made of polyvinyl alcohol (PVA), polyethylene terephthalate (PET), nylon, polyethylene (PE), polyamide imide (PAI), or similar plastic, among others. In various embodiments, fusible fibers may include thermoplastic or thermoset fibers. In that regard, fusible fibers may include polyetheretherketone (PEEK), polyaryleetherketones (PAEK), polyetherketoneketone (PEKK), polyester imide (PEI), polyimide (PI), phenolics, pitch, or similar polymers, among others. Other suitable polymers or combinations thereof may be used, without limitation.

In various embodiments, the fabric layers may then be stacked, in a near net shape tool, with each successive layer containing the desired fiber percentages of fugitive fibers, fusible fibers, and/or carbon fibers thereby forming a commingled fiber preform. In various embodiments, the fiber percentages may be varied such that interior plies of the commingled fiber preform may contain a higher percentage of carbon fibers and a lower percentage of fugitive fibers or fusible fibers while the exterior plies of the commingled fiber preform may conversely contain a lower percentage of carbon fibers and a higher percentage of fugitive fibers or fusible fibers. In various embodiments, during stacking, the fabric layers may be tacked together using a variety of methods, e.g. an adhesive tackifier, a hot iron to locally melt a thermoplastic, or an ultra-sonic thermoplastic welder, among others. In various embodiments, as the commingled fiber preform is stacked, the various fabric layers may be joined through thickness reinforcement (TTR) via needling, tufting, stitching, or z-pinning, using a commingled fiber thread that includes fugitive fibers, fusible fibers, and/or carbon fibers. In various embodiments, once all the fabric layers are stacked, then all the fabric layers are needled, tufted, stitched, or z-pinned together. In various embodiments, as each successive fabric layer is added, then the fabric layers may be needled, tufted, stitched, or z-pinned together. In various embodiments, the needling, tufting, stitching, or z-pinning may penetrate all the fabric layers. In various embodiments, the needling, tufting, stitching, or z-pinning may penetrate only a predefined number of fabric layers. In various embodiments, a number of fabric layers that are needled, tufted, stitched, or z-pinned may vary as the commingled fiber preform is generated. In various embodiments, once the commingled fiber preform is completely stacked and needled, the commingled fiber preform may be placed in a close die mold or vacuum bag tooling and subjected to heat and pressure to consolidate the commingled fiber preform, allowing the fusible and fugitive fibers to wet out, i.e. be completely coated, into the carbon-fiber and create a path through the thickness for infiltration of fluids.

In various embodiments, once consolidation is complete, the commingled fiber preform may undergo pyrolysis, or heat-treatment in an inert environment (pyrolysis may be alternatively referred to as pyrolyzation), where the fugitive fibers in the commingled fiber preform are burned, melted, or evaporated, and the fusible fibers decompose leaving behind a carbon char that forms the matrix. In various embodiments, once pyrolysis is complete, the commingled fiber preform may undergo Chemical Vapor Infiltration (CVI) densification. In various embodiments, once the CVI densification is complete, the commingled fiber preform may undergo skim cut machining where the surface of the commingled fiber preform is modified to meet a set of standards for the commingled fiber preform. In various embodiments, the pyrolysis, CVI densification and skim cutting may be repeated until a desired part density is reached. In various embodiments, once the desired part density is reached, a final machining may be performed on the commingled fiber preform to meet desired commingled fiber preform dimensions.

In various embodiments, once consolidation is complete, the commingled fiber preform may undergo polymer infiltration where a thermoset or thermoplastic resin such as phenolic or pitch is injected into the commingled fiber preform and then cured. In various embodiments, once the thermoset resin is cured, the commingled fiber preform may undergo pyrolysis where the fugitive fibers in the commingled fiber preform are burned, melted, or evaporated, and the fusible fibers are pyrolyzed into a carbon matrix. In various embodiments, once pyrolysis is complete, the commingled fiber preform may undergo further densification via Chemical Vapor Infiltration (CVI) densification. In various embodiments, once the CVI densification is complete, the commingled fiber preform may undergo skim cut machining where the surface of the commingled fiber preform is modified to meet a set of standards for the commingled fiber preform. In various embodiments, at least one of polymer infiltration, the pyrolysis, CVI densification and skim cutting may be repeated until a desired part density is reached. In various embodiments, once the desired part density is reached, a final machining may be performed on the commingled fiber preform to meet desired commingled fiber preform dimensions.

Referring now to FIG. 1, in accordance with various embodiments, a fabric layer formed using commingled fibers including percentages of fugitive fibers, fusible fibers, and/or carbon fibers is illustrated. In various embodiments, the fabric layer 100 includes a plurality of tows 102a-102n. In various embodiments, each tow of the plurality of tows 102a-102n includes a percentage of carbon fibers 104, fusible fibers 106, and fugitive fibers 108. In various embodiments, each tow of the plurality of tows 102a-102n includes only carbon fibers 104. In various embodiments, each tow of the plurality of tows 102a-102n includes carbon fibers 104 and either fusible fibers 106 or fugitive fibers 108. In various embodiments, each tow of the plurality of tows 102a-102n includes carbon fibers 104, fusible fibers 106, and fugitive fibers 108. In various embodiments, in a particular fabric layer 100, each tow of the plurality of tows 102a-102n includes the same percentage of carbon fibers 104, fusible fibers 106, and/or fugitive fibers 108. In various embodiments, in a particular fabric layer 100, one or more tows of the plurality of tows 102a-102n may include a different percentage of carbon fibers 104, fusible fibers 106, and/or fugitive fibers 108 than another one or more tows of the plurality of tows 102a-102n. In various embodiments, the fabric layer 100 has a directionality that coincides with the direction of the tows 102a-102n.

Figure 2A:
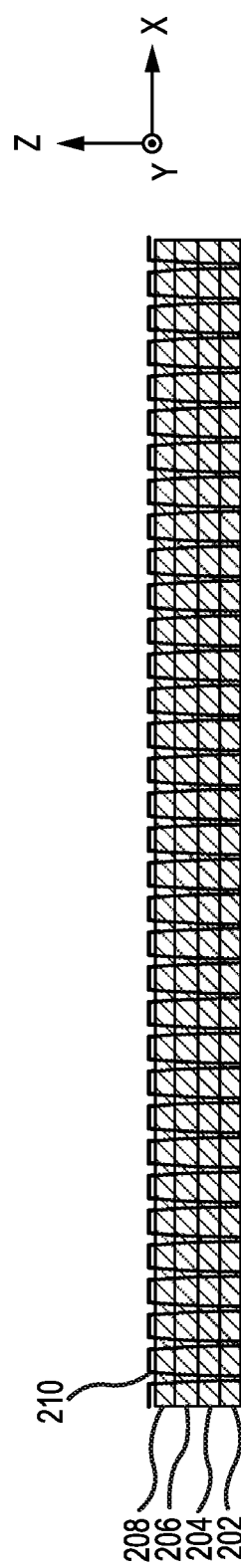
FIGS. 2A and 2B illustrate a commingled fiber preform using commingled fiber fabric layers, in accordance with various embodiments.
Figure 2B:
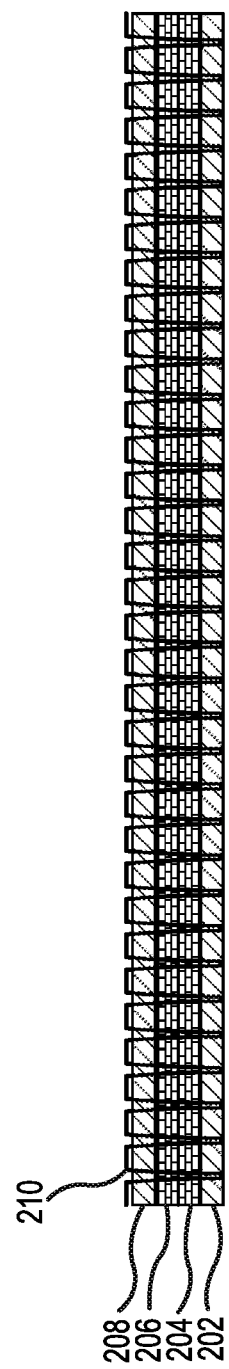

Referring now to FIGS. 2A and 2B, in accordance with various embodiments, a commingled fiber preform using commingled fiber fabric layers is illustrated. In various embodiments, as illustrated in FIG. 2A, each of fabric layers 202, 204, 206, and 208 may have consistent percentages of fugitive fibers, fusible fibers, and/or carbon fibers. In various embodiments, each of fabric layers 202, 204, 206, and 208 may include fugitive fibers and carbon fibers where a ratio of fugitive fibers to carbon fibers may be 1:2, 1:3, or 1:4, among others, as long as the carbon fiber percentage is larger than the fugitive fiber percentage. In various embodiments, each of fabric layers 202, 204, 206, and 208 may include fugitive fibers and fusible fibers, where a ratio of fugitive fibers to fusible fibers may be 1:2, 1:3, or 1:4, among others, as long as the fusible fiber percentage is larger than the fugitive fiber percentage. In various embodiments, each of fabric layers 202, 204, 206, and 208 may include fugitive fibers, carbon fibers, and fusible fibers, where a ratio of fugitive fibers to carbon fibers to fusible fibers may be 1:2:2, 1:3:2, 1:2:3, 1:3:3, or 1:4:2, among others, as long as the carbon fiber and fusible fiber percentages are larger than the fugitive fiber percentage. In various embodiments, as illustrated in FIG. 2B, fabric layers 202 and 208 may have a same percentage of fugitive fibers, fusible fibers, and/or carbon fibers and fabric layers 204 and 206, while having a same percentage of fugitive fibers, fusible fibers, and/or carbon fibers, may have a different percentage of fugitive fibers, fusible fibers, and/or carbon fibers from fabric layers 202 and 208. In various embodiments, once the desired number of layers has been reached for the preform ply stack, fabric layers 202, 204, 206, and 208 may be joined through thickness reinforcement (TTR) via external needling, tufting, stitching, or z-pinning, among others. In various embodiments, the TTR utilizes a commingled fiber thread 210 that includes fugitive fibers, fusible fibers, and/or carbon fibers. In various embodiments, commingled fiber thread 210 includes fugitive fibers and carbon fibers where a ratio of fugitive fibers to carbon fibers may be 1:2, 1:3, or 1:4, among others, as long as the carbon fiber percentage is larger than the fugitive fiber percentage. In various embodiments, commingled fiber thread 210 includes fugitive fibers and fusible fibers, where a ratio of fugitive fibers to fusible fibers may be 1:2, 1:3, or 1:4, among others, as long as the fusible fiber percentage is larger than the fugitive fiber percentage. In various embodiments, commingled fiber thread 210 includes fugitive fibers, carbon fibers, and fusible fibers, where a ratio of fugitive fibers to carbon fibers to fusible fibers may be 1:2:2, 1:3:2, 1:2:3, 1:3:3, or 1:4:2, among others, as long as the carbon fiber and fusible fiber percentages are larger than the fugitive fiber percentage. In various embodiments, the TTR is performed in a uniform manner such that a number of needles, tufts, stiches, or z-pins are consistent along a length of the fabric layers 202, 204, 206, and 208 in the x-direction. In various embodiments, a transport depth in the z-direction of the TTR is through all the fabric layers 202, 204, 206, and 208 of the commingled fiber preform for the length of the commingled fiber preform in the x-direction. In various embodiments, generating a commingled fiber preform in this manner takes advantage of random fugitive fiber placement for uniform densification in through thickness direction, while maintaining high in-plane strengths.

Figure 3A:
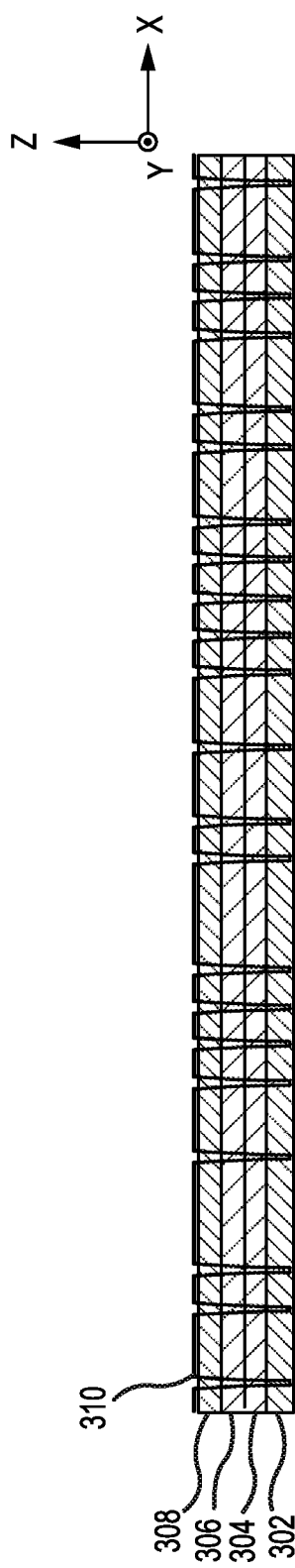
FIGS. 3A and 3B illustrate a commingled fiber preform using commingled fiber fabric layers, in accordance with various embodiments.
Figure 3B:
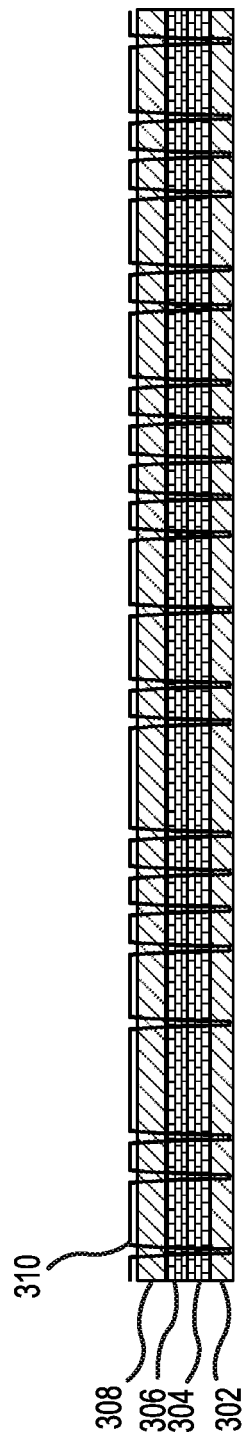

Referring now to FIGS. 3A and 3B, in accordance with various embodiments, a commingled fiber preform using commingled fiber fabric layers is illustrated. In various embodiments, as illustrated in FIG. 3A, each of fabric layers 302, 304, 306, and 308 may have a consistent percentage of fugitive fibers, fusible fibers, and/or carbon fibers. In various embodiments, each of fabric layers 302, 304, 306, and 308 may include fugitive fibers and carbon fibers where a ratio of fugitive fibers to carbon fibers may be 1:2, 1:3, or 1:4, among others, as long as the carbon fiber percentage is larger than the fugitive fiber percentage. In various embodiments, each of fabric layers 302, 304, 306, and 308 may include fugitive fibers and fusible fibers, where a ratio of fugitive fibers to fusible fibers may be 1:2, 1:3, or 1:4, among others, as long as the fusible fiber percentage is larger than the fugitive fiber percentage. In various embodiments, each of fabric layers 302, 304, 306, and 308 may include fugitive fibers, carbon fibers, and fusible fibers, where a ratio of fugitive fibers to carbon fibers to fusible fibers may be 1:2:2, 1:3:2, 1:2:3, 1:3:3, or 1:4:2, among others, as long as the carbon fiber and fusible fiber percentages are larger than the fugitive fiber percentage. In various embodiments, as illustrated in FIG. 3B, fabric layers 302 and 308 may have a same percentage of fugitive fibers, fusible fibers, and/or carbon fibers and fabric layers 304 and 306, while having a same percentage of fugitive fibers, fusible fibers, and/or carbon fibers, may have a different percentage of fugitive fibers, fusible fibers, and/or carbon fibers from fabric layers 302 and 308. In various embodiments, once the desired number of layers has been reached for the preform ply stack, fabric layers 302, 304, 306, and 308 may be joined through thickness reinforcement (TTR) via external needling, tufting, stitching, or z-pinning, among others. In various embodiments, the TTR utilizes a commingled fiber thread 310 that includes fugitive fibers, fusible fibers, and/or carbon fibers. In various embodiments, commingled fiber thread 310 includes fugitive fibers and carbon fibers, where a ratio of fugitive fibers to carbon fibers may be 1:2, 1:3, or 1:4, among others, as long as the carbon fiber percentage is larger than the fugitive fiber percentage. In various embodiments, commingled fiber thread 310 includes fugitive fibers and fusible fibers, where a ratio of fugitive fibers to fusible fibers may be 1:2, 1:3, or 1:4, among others, as long as the fusible fiber percentage is larger than the fugitive fiber percentage. In various embodiments, commingled fiber thread 310 includes fugitive fibers, carbon fibers, and fusible fibers, where a ratio of fugitive fibers to carbon fibers to fusible fibers may be 1:2:2, 1:3:2, 1:2:3, 1:3:3, or 1:4:2, among others, as long as the carbon fiber and fusible fiber percentages are larger than the fugitive fiber percentage. In various embodiments, the through thickness reinforcement (TTR) is performed in a random manner such that a number of needles, tufts, stiches, or z-pins vary along a length of the fabric layers 202, 204, 206, and 208 in the x-direction. In various embodiments, a transport depth in the z-direction of the TTR is though all of the fabric layers 202, 204, 206, and 208 of the commingled fiber preform for the length of the commingled fiber preform in the x-direction. In various embodiments, generating a commingled fiber preform in this manner takes advantage of random fugitive fiber placement for uniform densification.

Figure 4:
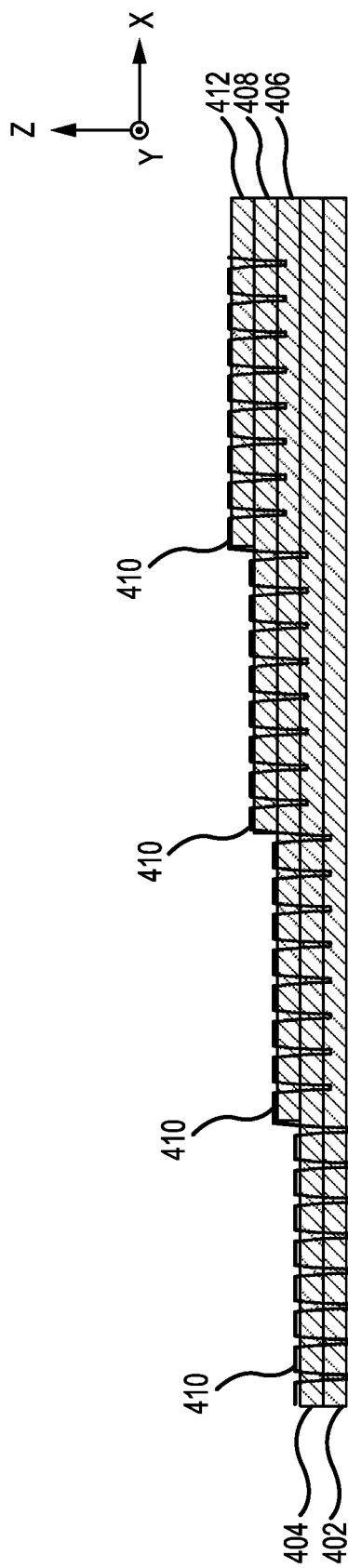
FIG. 4 illustrates through thickness reinforcement (TTR) of a commingled fiber preform where a transport depth coincides with the number of fabric layers added to the preform, in accordance with various embodiments.

Referring now to FIG. 4, in accordance with various embodiments, through thickness reinforcement (TTR) of a commingled fiber preform where a transport depth coincides with the number of fabric layers added to the commingled fiber preform is illustrated. In various embodiments, a transport depth in the z-direction of the TTR only penetrates a current fabric layer and an immediate previous fabric layer. In that regard, responsive to fabric layer 404 being laid on top of fabric layer 402, the TTR using commingled fiber thread 410 penetrates the fabric layer 404 and fabric layer 402. Responsive to fabric layer 406 being laid on top of fabric layer 404, the TTR using commingled fiber thread 410 penetrates only fabric layer 406 and fabric layer 404. Responsive to fabric layer 408 being laid on top of fabric layer 406, the TTR using commingled fiber thread 410 penetrates only fabric layer 408 and fabric layer 406. Responsive to fabric layer 412 being laid on top of fabric layer 408, the TTR using commingled fiber thread 410 penetrates only fabric layer 412 and fabric layer 408. In various embodiments, the TTR utilizes a commingled fiber thread 410 that includes fugitive fibers, fusible fibers, and/or carbon fibers. In various embodiments, commingled fiber thread 410 includes fugitive fibers and carbon fibers. In various embodiments, commingled fiber thread 410 includes fugitive fibers and fusible fibers. In various embodiments, commingled fiber thread 410 includes fugitive fibers, carbon fibers, and fusible fibers.

Figure 5:
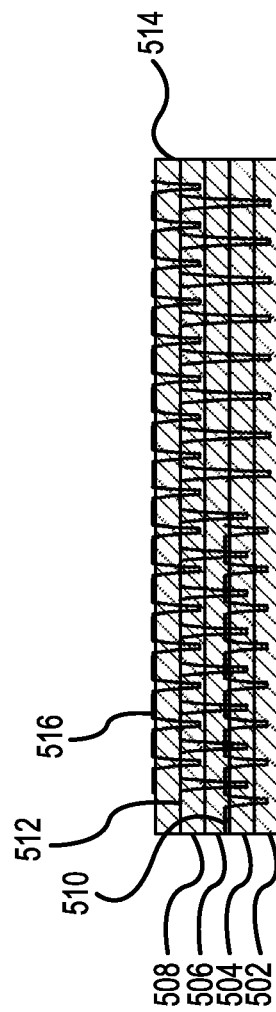
FIG. 5 illustrates through thickness reinforcement (TTR) of a commingled fiber preform where a transport depth of the TTR varies with regard to a number of fabric layers as well as length of the commingled fiber preform, in accordance with various embodiments.

Referring now to FIG. 5, in accordance with various embodiments, through thickness reinforcement (TTR) of a commingled fiber preform where a transport depth of the TTR varies with regard to a number of fabric layers as well as length of the commingled fiber preform is illustrated. In various embodiments, responsive to fabric layer 504 being laid on top of fabric layer 502, the TTR using commingled fiber thread 510 penetrates completely through a thickness of the fabric layer 504 and partially through a thickness of fabric layer 502 but only for a portion of the length of the commingled fiber preform in the x-direction. Responsive to fabric layer 506 being laid on top of fabric layer 504 and then fabric layer 508 being laid on top of fabric layer 506, the TTR using commingled fiber thread 512 penetrates completely through a thickness of the fabric layers 508 and 506 and partially through a thickness of the fabric layer 504 for a first portion of the length of the commingled fiber preform in the x-direction and then penetrates completely through a thickness of fabric layers 508, 506, and 504 and partially through a thickness of fabric layer 502 for a second portion of the length of the commingled fiber preform in the x-direction. Responsive to fabric layer 514 being laid on top of fabric layer 508, the TTR using commingled fiber thread 516 penetrates completely through a thickness of fabric layer 514 and partially though a thickness of fabric layer 508 for the first portion and the second portion of the length of the commingled fiber preform in the x-direction. In various embodiments, the commingled fiber threads 510, 512, and 516 may include fugitive fibers, fusible fibers, and/or carbon fibers. In various embodiments, the commingled fiber threads 510, 512, and 516 may include fugitive fibers and carbon fibers. In various embodiments, the commingled fiber threads 510, 512, and 516 may include fugitive fibers and fusible fibers. In various embodiments, the commingled fiber threads 510, 512, and 516 may include fugitive fibers, carbon fibers, and fusible fibers. In various embodiments, generating a commingled fiber preform in this manner takes advantage of random fugitive fiber placement for targeted densification in through thickness direction, while maintaining high in-plane strengths.

Figure 6:
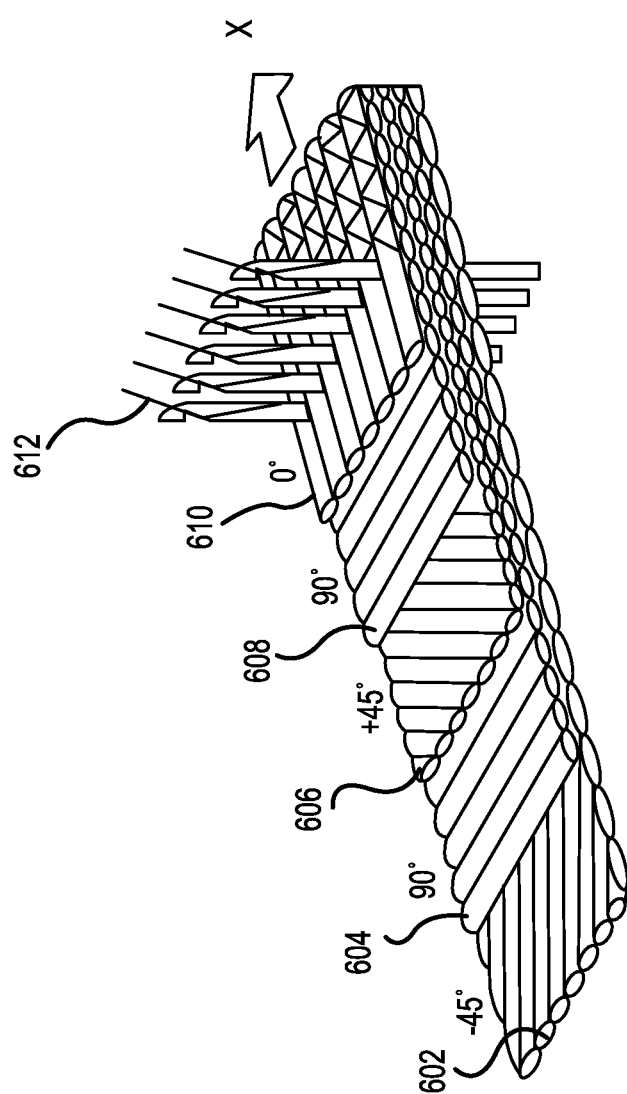
FIG. 6 illustrates a multi-axial non-woven commingled fiber preform, in accordance with various embodiments.

Referring now to FIG. 6, in accordance with various embodiments, a multi-axial non-woven commingled fiber preform is illustrated. In various embodiments, the multi-axial non-woven commingled fiber preform 600 includes a first fabric layer 602 positioned such that its directionality, which coincides with the direction of the tows, is at a first angle, i.e. −45 degrees with respect to the x-axis. In various embodiments, a second fabric layer 604 is laid on top of the first fabric layer 602 and positioned such that its directionality is at a second angle, i.e. 90 degrees with respect to the x-axis. In various embodiments, a third fabric layer 606 is laid on top of the second fabric layer 604 and positioned such that its directionality is at a third angle, i.e. +45 degrees with respect to the x-axis. In various embodiments, a fourth fabric layer 608 is laid on top of the third fabric layer 609 and positioned such that its directionality is at the second angle, i.e. 90 degrees with respect to the x-axis. In various embodiments, a fifth fabric layer 610 is laid on top of the fourth fabric layer 608 and positioned such that its directionality is at a fourth angle, i.e. 0 degrees with respect to the x-axis. In various embodiments, the multi-axial non-woven commingled fiber preform 600 that includes fabric layers 602-610 provides for each fabric layer to be tailored dependent on the location within the commingled fiber preform and whether high or low warp strength is required. In various embodiments, the multi-axial non-woven commingled fiber preform 600 is ideal for complex shapes which may require laying up on complex contour surfaces, where warp strength differentials may be preferred, which allows for the tailoring of in-plane strengths in certain directions and in certain regions. In various embodiments, once the multi-axial non-woven commingled fiber preform 600 that includes fabric layers 602-610 is laid up, the multi-axial non-woven commingled fiber preform undergoes through thickness reinforcement (TTR) such as the TTR described in FIGS. 2A, 2B, 3A, 3B, 4, and 5. In various embodiments, the TTR utilizes a commingled fiber thread 612 that includes fugitive fibers, fusible fibers, and/or carbon fibers. In various embodiments, commingled fiber thread 612 includes fugitive fibers and carbon fibers. In various embodiments, commingled fiber thread 612 includes fugitive fibers and fusible fibers. In various embodiments, commingled fiber thread 612 includes fugitive fibers, carbon fibers, and fusible fibers.

Referring now to FIGS. 7A-7F, in accordance with various embodiments, a woven fabric for use as a fabric layer to be utilized in the embodiments of FIGS. 2A, 2B, 3A, 3B, 4, 5, and 6 is illustrated. In various embodiments, commingled fibers in the warp direction, i.e. in the y-direction may include fugitive fibers, fusible fibers, and/or carbon fibers. Likewise, in various embodiments, commingled fibers in the warp direction, i.e. in the x-direction may also include fugitive fibers, fusible fibers, and/or carbon fibers. In that regard, in various embodiments, commingled fibers in the warp or weft directions may include fugitive fibers and carbon fibers where a ratio of fugitive fibers to carbon fibers may be 1:2, 1:3, or 1:4, among others, as long as the carbon fiber percentage is larger than the fugitive fiber percentage. In various embodiments, commingled fibers in the warp or weft directions may include fugitive fibers and fusible fibers, where a ratio of fugitive fibers to fusible fibers may be 1:2, 1:3, or 1:4, among others, as long as the fusible fiber percentage is larger than the fugitive fiber percentage. In various embodiments, commingled fibers in the warp or weft directions may include fugitive fibers, carbon fibers, and fusible fibers, where a ratio of fugitive fibers to carbon fibers to fusible fibers may be 1:2:2, 1:3:2, 1:2:3, 1:3:3, or 1:4:2, among others, as long as the carbon fiber and fusible fiber percentages are larger than the fugitive fiber percentage.

Figure 7A:
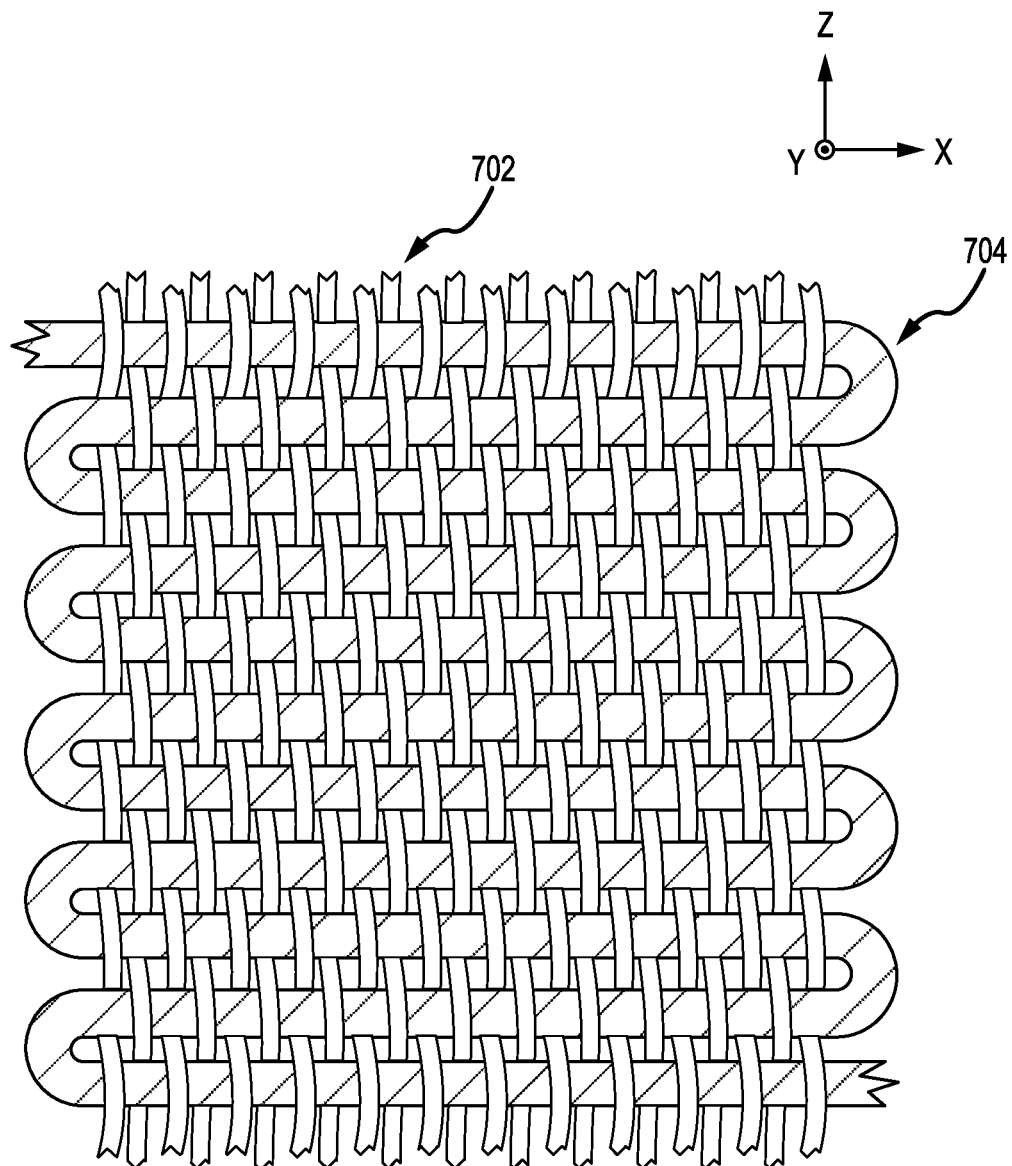
FIGS. 7A, 7B, 7C, 7D, 7E, and 7F illustrate a woven fabric for use as a fabric layer to be utilized in the embodiments of FIGS. 2A, 2B, 3A, 3B, 4, 5, and 6, in accordance with various embodiments.
Figure 7B:
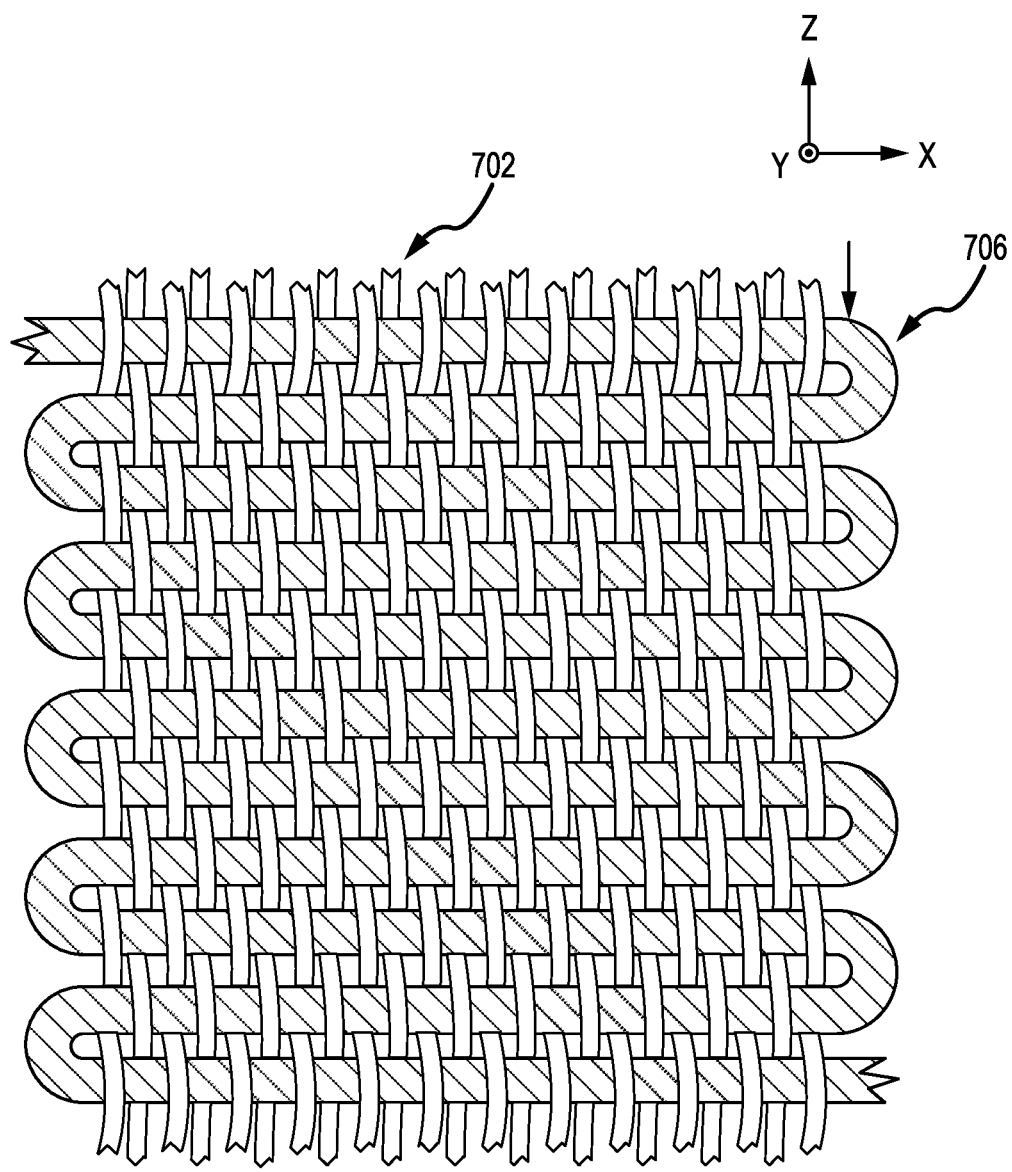
Figure 7C:
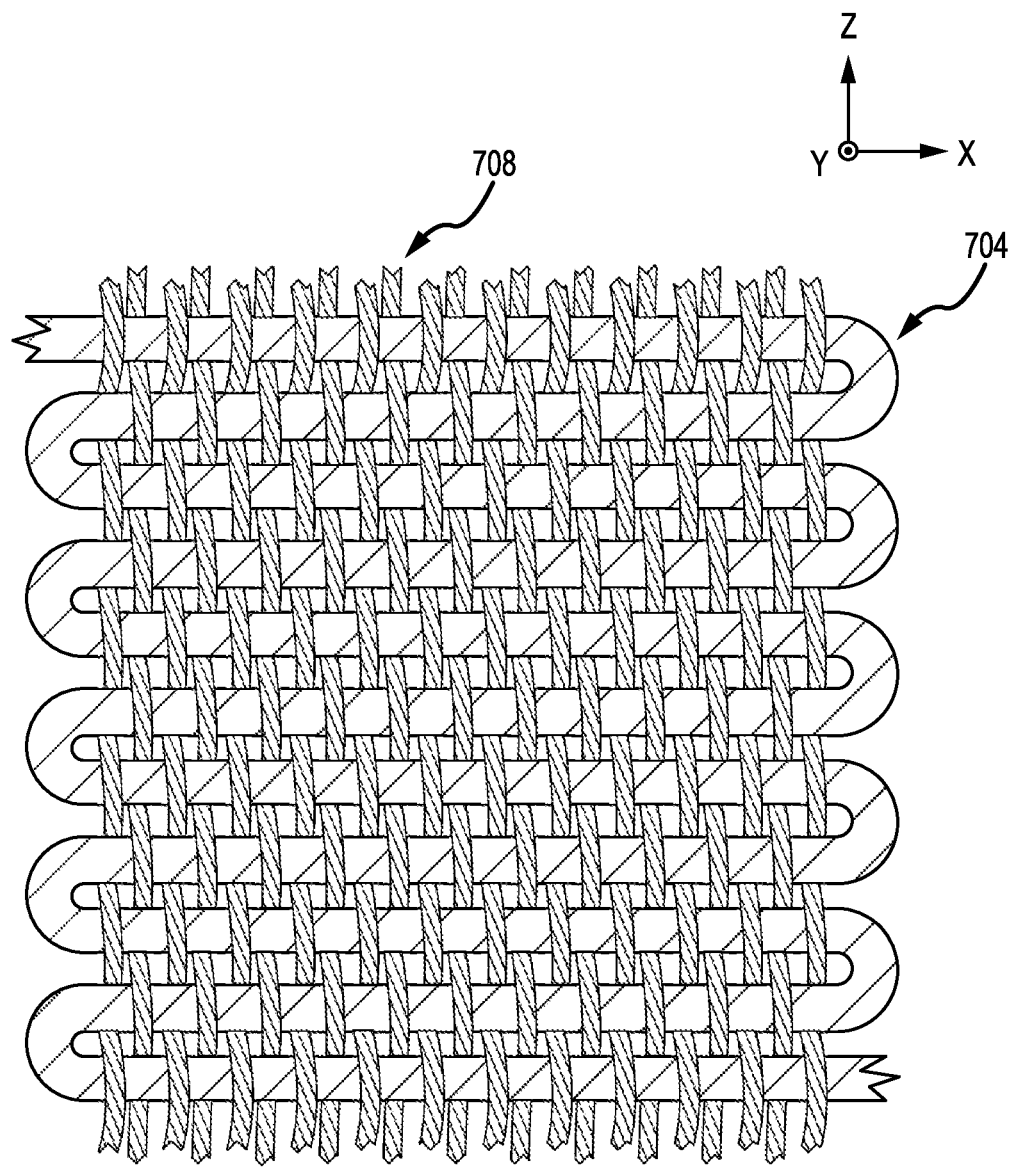
Figure 7D:
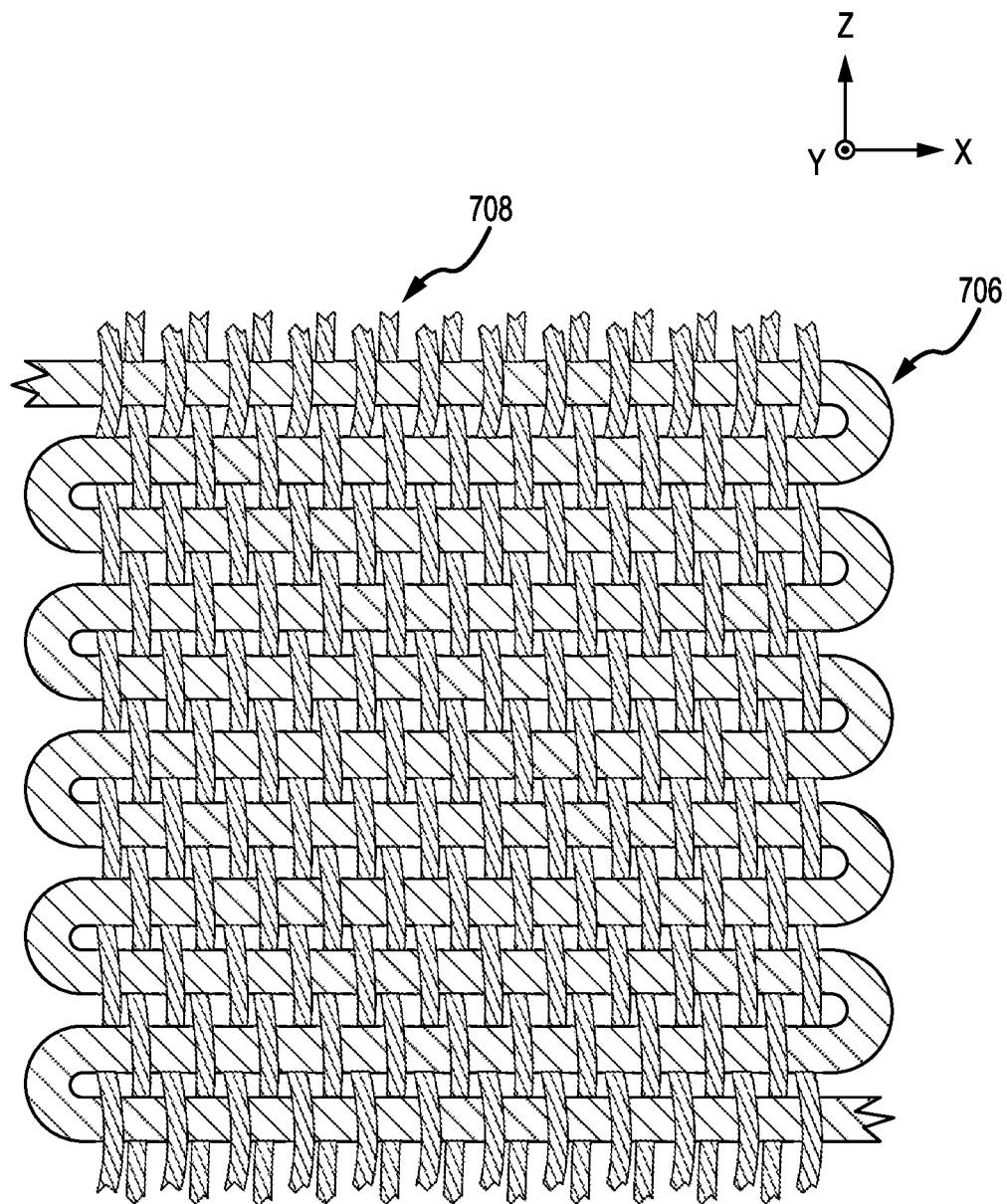
Figure 7E:
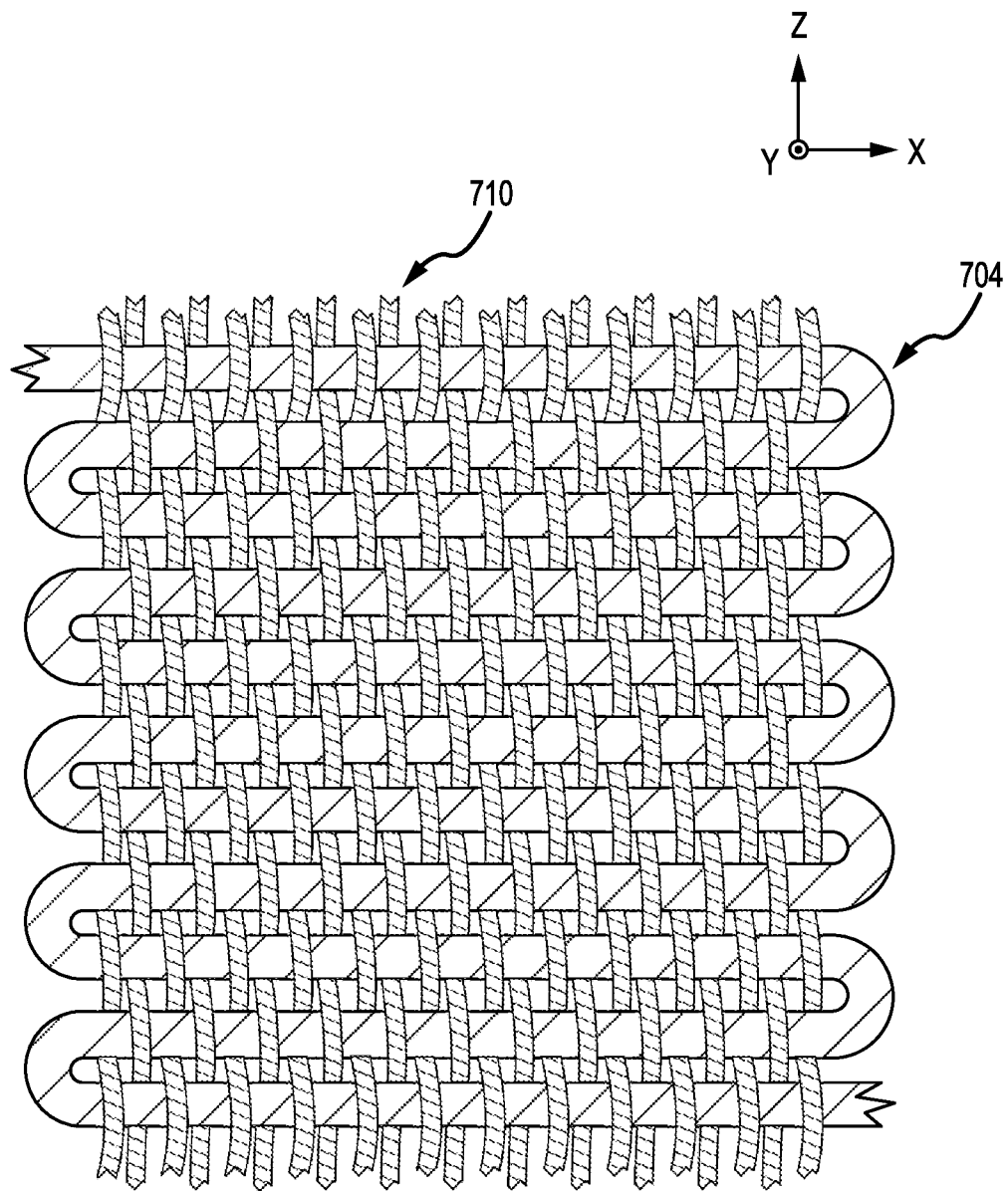
Figure 7F:
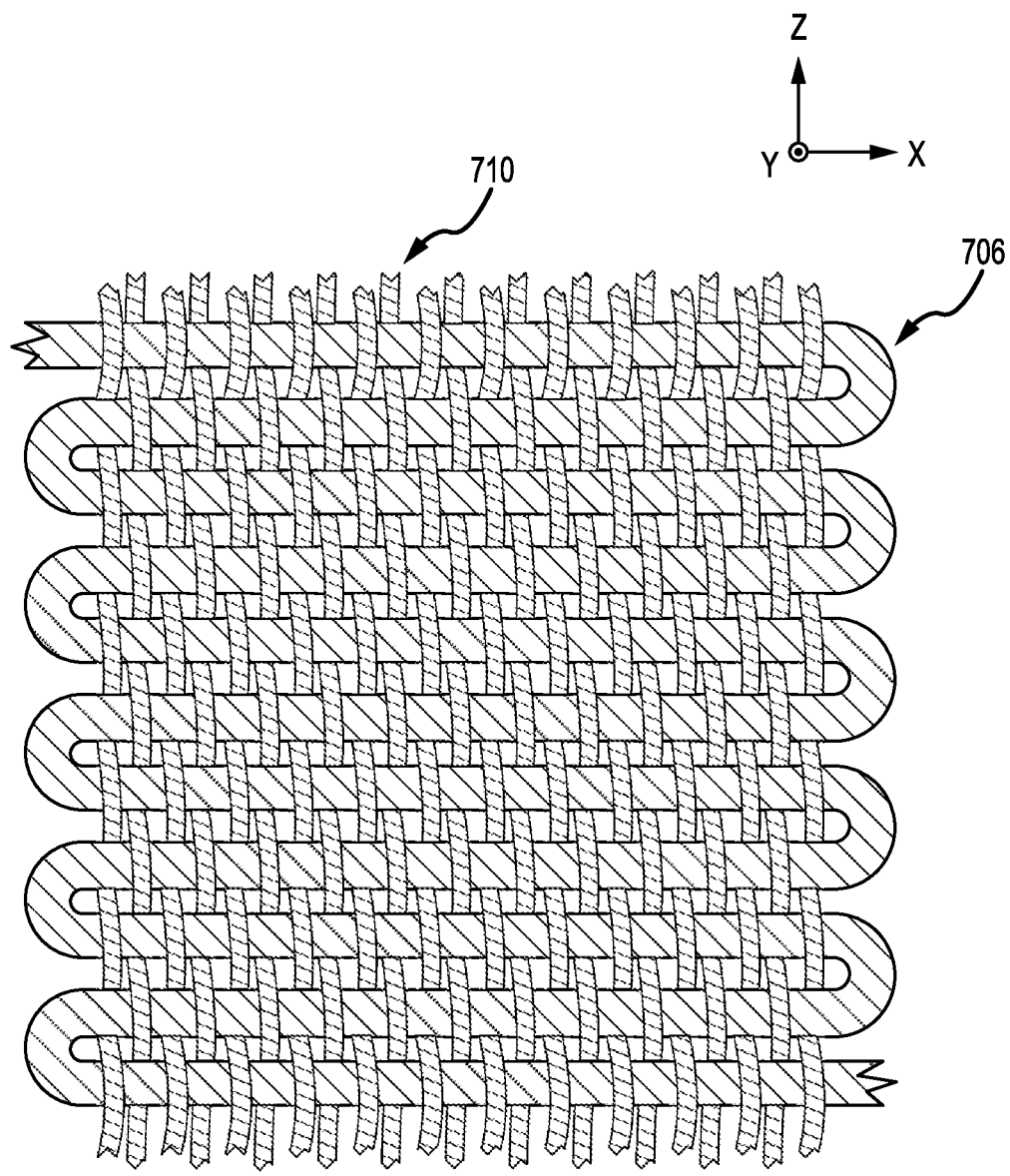

In FIG. 7A, the commingled fibers 702 in the warp direction include fusible fibers and fugitive fibers and the commingled fibers 704 in the weft direction include only carbon fibers. In FIG. 7B, the commingled fibers 702 in the warp direction include fusible fibers and fugitive fibers and the commingled fibers 706 in the weft direction include carbon fibers and fusible fibers. In FIG. 7C, the commingled fibers 708 in the warp direction include carbon fibers and fugitive fibers and the commingled fibers 704 in the weft direction include only carbon fibers. In FIG. 7D, the commingled fibers 708 in the warp direction include carbon fibers and fugitive fibers and the commingled fibers 706 in the weft direction include carbon fibers and fusible fibers. In FIG. 7E, the commingled fibers 710 in the warp direction include carbon fibers, fusible fibers, and fugitive fibers and the commingled fibers 704 in the weft direction include only carbon fibers. In FIG. 7F, the commingled fibers 710 in the warp direction include carbon fibers, fusible fibers, and fugitive fibers and the commingled fibers 706 in the weft direction include carbon fibers and fusible fibers. In various embodiments, tailoring of in-plane strengths of the fabric layer in certain directions, may result in the creation of a quasi-unidirectional fabric layer in a finished composite. In various embodiments, changing the mix of carbon fibers and fusible fibers in the weft directions may provide for an advantageous strength differential between warp and weft directions.

Figure 8:
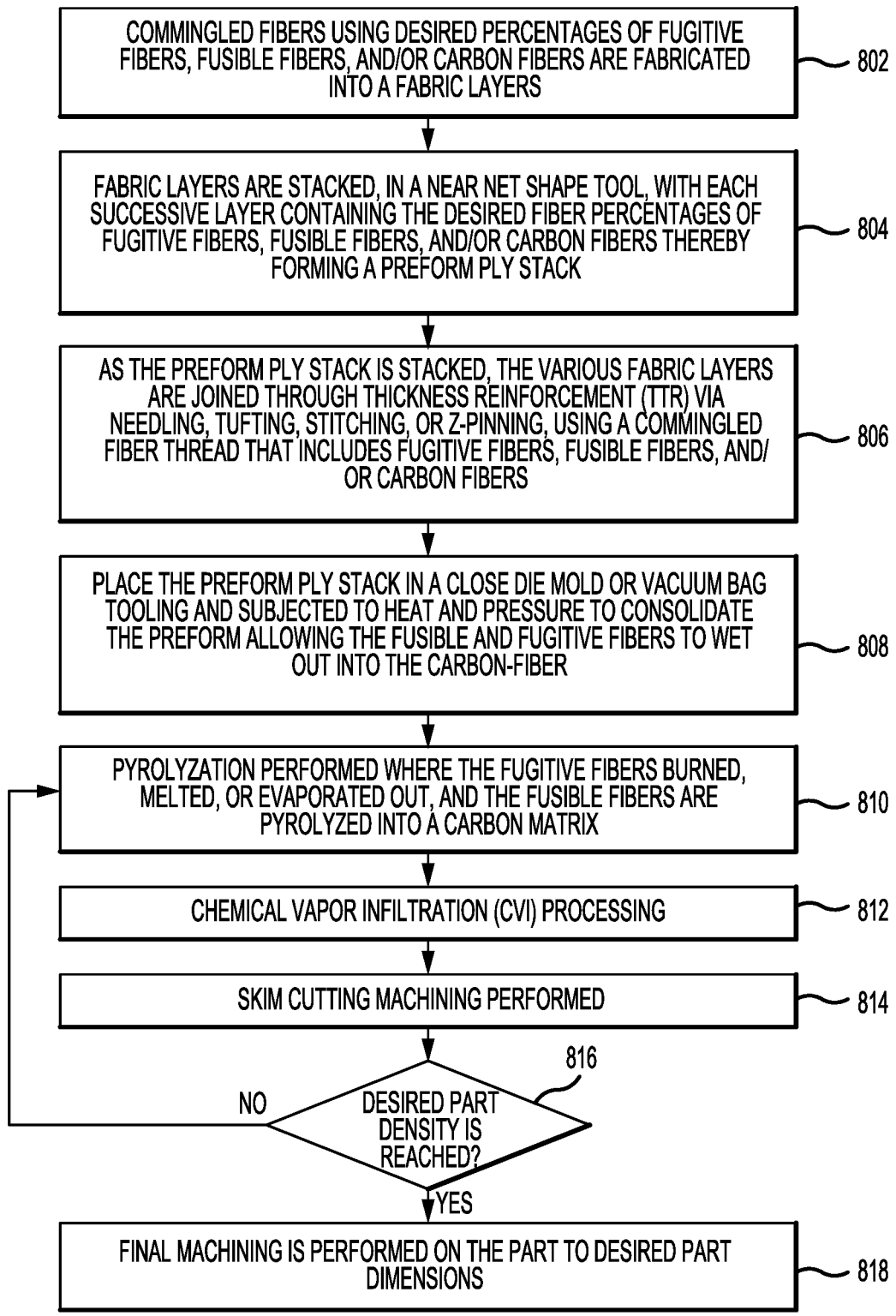
FIG. 8 illustrates a method of forming a commingled fiber preform for a high temperature composite, in accordance with various embodiments.

Referring now to FIG. 8, in accordance with various embodiments, a method of forming a commingled fiber preform for a high temperature composite is illustrated. At block 802, commingled fibers using desired percentages of fugitive fibers, fusible fibers, and/or carbon fibers are fabricated into a fabric layers of either woven fabric layers, a non-crimp fabric layers, such as unidirectional or stitched unidirectional, or a felt fabric layers. At block 804, the fabric layers are stacked, in a near net shape tool, with each successive layer containing the desired fiber percentages of fugitive fibers, fusible fibers, and/or carbon fibers thereby forming a commingled fiber preform. At block 806, as the commingled fiber preform is stacked, the various fabric layers may be joined through thickness reinforcement (TTR) via needling, tufting, stitching, or z-pinning, using a commingled fiber thread that includes fugitive fibers, fusible fibers, and/or carbon fibers. At block 808, once the commingled fiber preform is completely stacked and needled, the commingled fiber preform may be placed in a close die mold or vacuum bag tooling and subjected to heat and pressure to consolidate the commingled fiber preform allowing the fusible and fugitive fibers to wet out into the carbon fiber and create a path through the thickness for infiltration of fluids.

At block 810, once consolidation is complete, the commingled fiber preform undergoes pyrolysis where the fugitive fibers in the commingled fiber preform are burned, melted, or evaporated, and the fusible fibers are pyrolyzed into a carbon matrix. At block 812, once pyrolysis is complete, the commingled fiber preform may undergo Chemical Vapor Infiltration (CVI) densification. At block 814, once the CVI densification is complete, the commingled fiber preform may undergo skim cut machining where the surface of the commingled fiber preform modified to meet a set of standards for the commingled fiber preform. At block 816 a determination is made as to whether a desired part density is reached. If at block 816 the desired part density has not been reached, the operation returns to block 810. If at block 816 the desired part density has been reached, then, at block 818, a final machining may be performed on the commingled fiber preform to meet desired commingled fiber preform dimensions.

Figure 9:
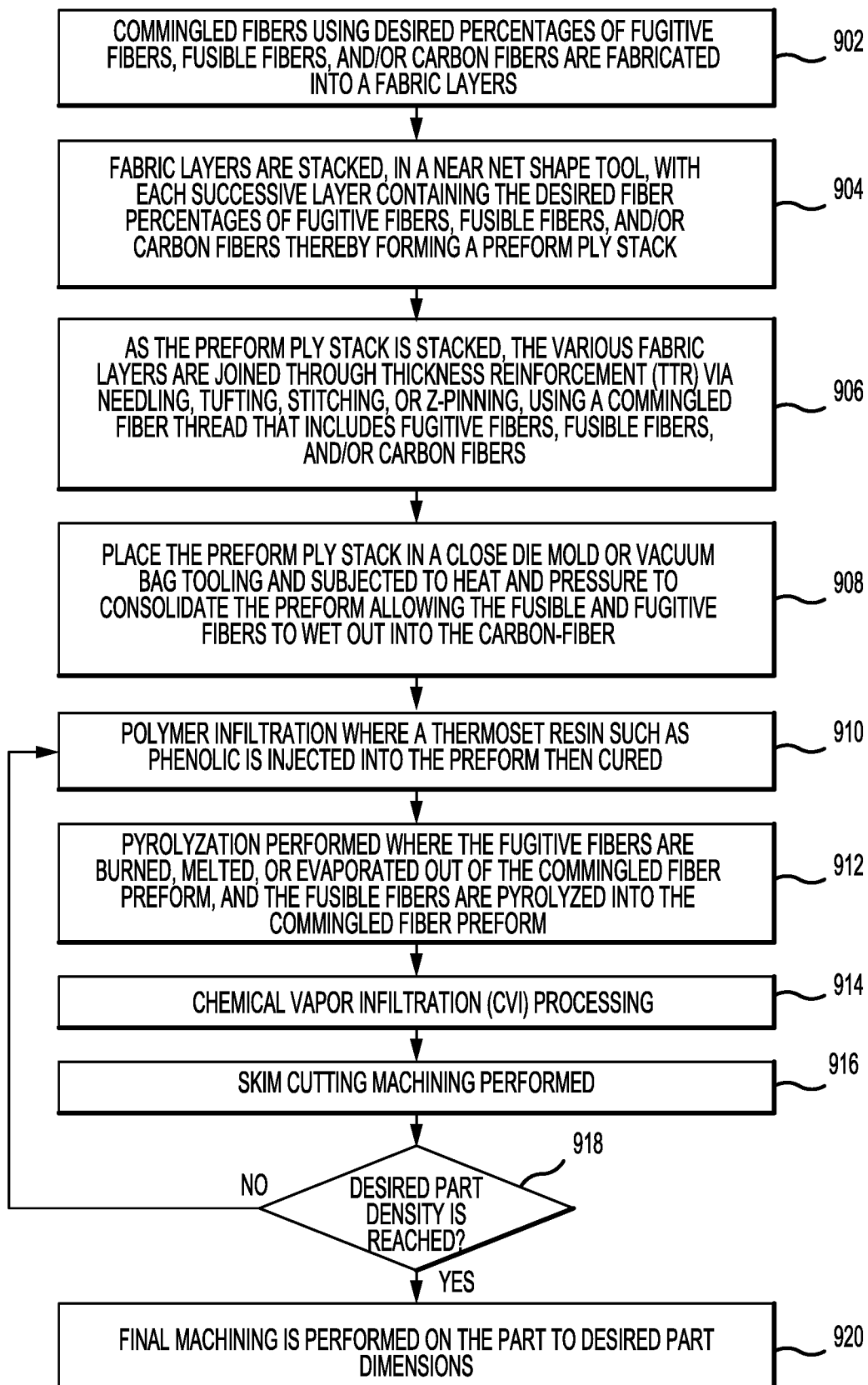
FIG. 9 illustrates a method of forming a commingled fiber preform for a high temperature composite, in accordance with various embodiments.

Referring now to FIG. 9, in accordance with various embodiments, a method of forming a commingled fiber preform for a high temperature composite is illustrated. At block 902, commingled fibers using desired percentages of fugitive fibers, fusible fibers, and/or carbon fibers are fabricated into a fabric layers of either woven fabric layers, a non-crimp fabric layers, such as unidirectional or stitched unidirectional, or a felt fabric layers. At block 904, the fabric layers are stacked, in a near net shape tool, with each successive layer containing the desired fiber percentages of fugitive fibers, fusible fibers, and/or carbon fibers thereby forming a commingled fiber preform. At block 906, as the commingled fiber preform is stacked, the various fabric layers may be joined through thickness reinforcement (TTR) via needling, tufting, stitching, or z-pinning, using a commingled fiber thread that includes fugitive fibers, fusible fibers, and/or carbon fibers. At block 908, once the commingled fiber preform is completely stacked and needled, the commingled fiber preform may be placed in a close die mold or vacuum bag tooling and subjected to heat and pressure to consolidate the commingled fiber preform allowing the fusible and fugitive fibers to wet out into the carbon fiber and create a path through the thickness for infiltration of fluids.

At block 910, once consolidation is complete, the commingled fiber preform may undergo polymer infiltration where a thermoset resin, i.e. fluids, such as phenolic is injected into the commingled fiber preform and then cured. At block 912, once the thermoset resin is cured, the commingled fiber preform undergoes pyrolysis where the fugitive fibers in the commingled fiber preform are burned, melted, or evaporated out, and the fusible fibers are pyrolyzed into a carbon matrix. At block 914, once pyrolysis is complete, the commingled fiber preform may undergo Chemical Vapor Infiltration (CVI) densification. At block 916, once the CVI densification is complete, the commingled fiber preform may undergo skim cut machining where the surface of the commingled fiber preform modified to meet a set of standards for the commingled fiber preform. At block 918 a determination is made as to whether a desired part density is reached. If at block 918 the desired part density has not been reached, the operation returns to block 910. If at block 918 the desired part density has been reached, then, at block 920, a final machining may be performed on the commingled fiber preform to meet desired commingled fiber preform dimensions.

In various embodiments, once consolidation is complete, the commingled fiber preform may undergo polymer infiltration where a thermoset resin such as phenolic is injected into the commingled fiber preform and then cured. In various embodiments, once the thermoset resin is cured, the commingled fiber preform may undergo pyrolysis where the fugitive fibers in the commingled fiber preform are burned, melted, or evaporated out, and the fusible fibers are pyrolyzed into a carbon matrix. In various embodiments, once pyrolysis is complete, the commingled fiber preform may undergoes Chemical Vapor Infiltration (CVI) densification. In various embodiments, once the CVI densification is complete, the commingled fiber preform may undergo skim cut machining where the surface of the commingled fiber preform modified to meet a set of standards for the commingled fiber preform. In various embodiments, the polymer infiltration, the pyrolysis, CVI densification and skim cutting may be repeated until a desired part density is reached. In various embodiments, once the desired part density is reached, a final machining may be performed on the commingled fiber preform to meet desired commingled fiber preform dimensions.

Therefore, the illustrative embodiments provide for the creation of complex contour fibrous preforms, with a variety of thicknesses, which take advantage of commingled fibers. Carbon and fugitive commingled fibers enable the commingled fiber preform to take advantage of high strength properties from the carbon fibers, and yield more uniform densification than traditional carbon fiber preforms. The addition of carbon and fusible commingled fibers enable higher densification yields in thick sections or complex contour geometries.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C. B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially." "about," or "approximately" as used herein represent an amount close to the stated amount that still performs a desired function or achieves a desired result. For example, the term "substantially." "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A porous fiber preform comprising:
   a first fabric layer, wherein the first fabric layer comprises first fugitive fibers, first carbon fibers, and first fusible fibers and wherein a percentage of the first carbon fibers together with a percentage of the first fusible fibers in the first fabric layer is larger than a percentage of the first fugitive fibers in the first fabric layer;
   a second fabric layer, wherein the second fabric layer comprises second fugitive fibers, second carbon fibers, second first fusible fibers, wherein a percentage of the second carbon fibers together with a percentage of the second fusible fibers in the second fabric layer is larger than a percentage of the second fugitive fibers in the second fabric layer, and wherein the percentage of the second carbon fibers, the percentage of the second fusible fibers, and the percentage of the second fugitive fibers in the second fabric layer is different from the percentage of the first carbon fibers, the percentage of the first fusible fibers, and the percentage of the first fugitive fibers in the first fabric layer;
   a third fabric layer, wherein the third fabric layer comprises third fugitive fibers, third carbon fibers, third first fusible fibers, wherein a percentage of the third carbon fibers together with a percentage of the third fusible fibers in the third fabric layer is larger than a percentage of the third fugitive fibers in the third fabric layer, and wherein the percentage of the third carbon fibers, the percentage of the third fusible fibers, and the percentage of the third fugitive fibers in the third fabric layer is different from the percentage of the first carbon fibers, the percentage of the first fusible fibers, and the percentage of the first fugitive fibers in the first fabric layer; and
   a fourth fabric layer, wherein the fourth fabric layer comprises fourth fugitive fibers, fourth carbon fibers, and fourth fusible fibers, wherein a percentage of the fourth carbon fibers together with a percentage of the fourth fusible fibers in the fourth fabric layer is larger than a percentage of the fourth fugitive fibers in the fourth fabric layer, and wherein the percentage of the fourth carbon fibers, the percentage of the fourth fusible fibers, and the percentage of the fourth fugitive fibers in the fourth fabric layer are different from the percentage of the second carbon fibers, the percentage of the second fusible fibers, and the percentage of the second fugitive fibers in the second fabric layer and the percentage of the third carbon fibers, the percentage of the third fusible fibers, and the percentage of the third fugitive fibers in the third fabric layer,
   wherein the second fabric layer and the third fabric layer are positioned between the first fabric layer and the fourth fabric layer,
   wherein the second fabric layer, the third fabric layer, and the fourth fabric layer are joined to the first fabric layer via through thickness reinforcement (TTR) using a commingled thread thereby forming a fiber preform,
   wherein a transport depth of the TTR penetrates completely through a thickness of the first fabric layer and partially through a thickness of one or more of the second fabric layer, the third fabric layer, or the fourth fabric layer,
   wherein, prior to pyrolysis, the commingled thread comprises fifth carbon fibers commingled with fifth fugitive fibers and fifth fusible fibers,
   wherein a ratio of the fifth fugitive fibers to the fifth carbon fibers to the fifth fusible fibers is 1:to at least 2:to at least 2,
   wherein, during pyrolysis, the first fugitive fibers, the second fugitive fibers, the third fugitive fibers, the fourth fugitive fibers, and the fifth fugitive fibers are pyrolyzed from the commingled fiber preform to create a path through the thickness for infiltration of fluids thereby forming the porous fiber preform, and wherein, during the pyrolysis, the first fusible fibers, the second fusible fibers, the third fusible fibers, the fourth fusible fibers, and the fifth fusible fibers decompose leaving behind a carbon char that forms a carbon matrix of the commingled fiber preform.

2. The commingled fiber preform of claim 1, wherein, in the first fabric layer, the first carbon fibers are commingled with the first fusible fibers and the first fugitive fibers, wherein, in the second fabric layer, the second carbon fibers are commingled with the second fusible fibers and the second fugitive fibers, wherein, in the third fabric layer, the third carbon fibers are commingled with the third fusible fibers and the third fugitive fibers, and wherein, in the fourth fabric layer, the fourth carbon fibers are commingled with the fourth fusible fibers and the fourth fugitive fibers.

3. The commingled fiber preform of claim 1, wherein a percentage of the fifth carbon fibers and a percentage of fifth fugitive fibers in the commingled thread is each at least 10% by volume.

4. The commingled fiber preform of claim 1, wherein the TTR is uniform throughout a length of the first fabric layer, the second fabric layer, the third fabric layer, and the fourth fabric layer.

5. The commingled fiber preform of claim 1, wherein the TTR is random throughout a length of the first fabric layer, the second fabric layer, the third fabric layer, and the fourth fabric layer.

6. The commingled fiber preform of claim 1, wherein the first fabric layer, the second fabric layer, the third fabric layer, and the fourth fabric layer have directionality indicated by a tow in each of the first fabric layer, the second fabric layer, the third fabric layer, and the fourth fabric layer and wherein, in positioning the second fabric layer and the third fabric layer between the first fabric layer and the fourth fabric layer, the directionality is the same.

7. The commingled fiber preform of claim 1, wherein the first fabric layer, the second fabric layer, the third fabric layer, and the fourth fabric layer have directionality indicated by a tow in each of the first fabric layer, the second fabric layer, the third fabric layer, and the fourth fabric layer and wherein, in positioning the second fabric layer and the third fabric layer between the first fabric layer and the fourth fabric layer, the directionality differs.

8. A manufacturing method, comprising:
forming a porous fiber preform by:
arranging a second fabric layer and a third fabric layer between a first fabric layer, wherein the first fabric layer comprises first fugitive fibers, first carbon fibers, and first fusible fibers, wherein a percentage of the first carbon fibers together with a percentage of the first fusible fibers in the first fabric layer is larger than a percentage of the first fugitive fibers in the first fabric layer, wherein the second fabric layer comprises second fugitive fibers, second carbon fibers, second first fusible fibers, wherein a percentage of the second carbon fibers together with a percentage of the second fusible fibers in the second fabric layer is larger than a percentage of the second fugitive fibers in the second fabric layer, wherein the percentage of the second carbon fibers, the percentage of the second fusible fibers, and the percentage of the second fugitive fibers in the second fabric layer is different from the percentage of the first carbon fibers, the percentage of the first fusible fibers, and the percentage of the first fugitive fibers in the first fabric layer, wherein the third fabric layer comprises third fugitive fibers, third carbon fibers, third first fusible fibers, wherein a percentage of the third carbon fibers together with a percentage of the third fusible fibers in the third fabric layer is larger than a percentage of the third fugitive fibers in the third fabric layer, wherein the percentage of the third carbon fibers, the percentage of the third fusible fibers, and the percentage of the third fugitive fibers in the third fabric layer is different from the percentage of the first carbon fibers, the percentage of the first fusible fibers, and the percentage of the first fugitive fibers in the first fabric layer, wherein the fourth fabric layer comprises fourth fugitive fibers, fourth carbon fibers, and fourth fusible fibers, wherein a percentage of the fourth carbon fibers together with a percentage of the fourth fusible fibers in the fourth fabric layer is larger than a percentage of the fourth fugitive fibers in the fourth fabric layer, and wherein the percentage of the fourth carbon fibers, the percentage of the fourth fusible fibers, and the percentage of the fourth fugitive fibers in the fourth fabric layer are different from the percentage of the second carbon fibers, the percentage of the second fusible fibers, and the percentage of the second fugitive fibers in the second fabric layer and the percentage of the third carbon fibers, the percentage of the third fusible fibers, and the percentage of the third fugitive fibers in the third fabric layer; and joining the second fabric layer, the third fabric layer, and the fourth fabric layer to the first fabric layer via through thickness reinforcement (TTR) using a commingled thread, wherein a transport depth of the TTR penetrates completely through a thickness of the first fabric layer and partially through a thickness of one or more of the second fabric layer, the third fabric layer, or the fourth fabric layer, wherein, prior to pyrolysis, the commingled thread comprises fifth carbon fibers commingled with fifth fugitive fibers and fifth fusible fibers, wherein a ratio of the fifth fugitive fibers to the fifth carbon fibers to the fifth fusible fibers is 1:to at least 2:to at least 2, wherein, during pyrolysis, the first fugitive fibers, the second fugitive fibers, the third fugitive fibers, the fourth fugitive fibers, and the fifth fugitive fibers are pyrolyzed from the commingled fiber preform to create a path through the thickness for infiltration of fluids, and wherein, during the pyrolysis, the first fusible fibers, the second fusible fibers, the third fusible fibers, the fourth fusible fibers, and the fifth fusible fibers decompose leaving behind a carbon char that forms a carbon matrix of the commingled fiber preform.

9. The manufacturing method of claim 8, wherein, in the first fabric layer, the first carbon fibers are commingled with the first fusible fibers and the first fugitive fibers, wherein, in the second fabric layer, the second carbon fibers are commingled with the second fusible fibers and the second fugitive fibers, wherein, in the third fabric layer, the third carbon fibers are commingled with the third fusible fibers and the third fugitive fibers, and wherein, in the fourth fabric layer, the fourth carbon fibers are commingled with the fourth fusible fibers and the fourth fugitive fibers.

10. The manufacturing method of claim 8, wherein a percentage of the fifth carbon fibers and a percentage of fifth fugitive fibers in the commingled thread is each at least 10% by volume.

11. The manufacturing method of claim 8, wherein the TTR is uniform throughout a length of the first fabric layer, the second fabric layer, the third fabric layer, and the fourth fabric layer.

12. The manufacturing method of claim 8, wherein the TTR is random throughout a length of the first fabric layer, the second fabric layer, the third fabric layer, and the fourth fabric layer.

13. The manufacturing method of claim 8, wherein the first fabric layer, the second fabric layer, the third fabric layer, and the fourth fabric layer have directionality indicated by a tow in each of the first fabric layer, the second fabric layer, the third fabric layer, and the fourth fabric layer and wherein, in positioning the second fabric layer and the third fabric layer between the first fabric layer and the fourth fabric layer, the directionality is the same.

14. The manufacturing method of claim 8, wherein the first fabric layer, the second fabric layer, the third fabric layer, and the fourth fabric layer have directionality indicated by a tow in each of the first fabric layer, the second fabric layer, the third fabric layer, and the fourth fabric layer and wherein, in positioning the second fabric layer and the third fabric layer between the first fabric layer and the fourth fabric layer, the directionality differs.

15. The porous fiber preform of claim 1, wherein the percentage of the third carbon fibers, the percentage of the third fusible fibers, and the percentage of the third fugitive fibers in the third fabric layer is the same as the percentage of the second carbon fibers, the percentage of the second fusible fibers, and the percentage of the second fugitive fibers in the second fabric layer.

16. The porous fiber preform of claim 1, wherein the percentage of the fourth carbon fibers, the percentage of the fourth fusible fibers, and the percentage of the fourth fugitive fibers in the fourth fabric layer are the same as the percentage of the first carbon fibers, the percentage of the first fusible fibers, and the percentage of the first fugitive fibers in the first fabric layer.

17. The manufacturing method of claim 8, wherein the percentage of the third carbon fibers, the percentage of the third fusible fibers, and the percentage of the third fugitive fibers in the third fabric layer is the same as the percentage of the second carbon fibers, the percentage of the second fusible fibers, and the percentage of the second fugitive fibers in the second fabric layer.

18. The manufacturing method of claim 8, wherein the percentage of the fourth carbon fibers, the percentage of the fourth fusible fibers, and the percentage of the fourth fugitive fibers in the fourth fabric layer are the same as the percentage of the first carbon fibers, the percentage of the first fusible fibers, and the percentage of the first fugitive fibers in the first fabric layer.

* * * * *